United States Patent

[11] 3,620,814

[72] Inventors Conrad A. Clark
Bethlehem;
Austin C. Dumbri, Easton; James F. Roberts, Bethlehem, all of Pa.
[21] Appl. No. 751,597
[22] Filed Aug. 9, 1968
[45] Patented Nov. 16, 1971
[73] Assignee Bell Telephone Laboratories, Incorporated
Murray Hill, Berkeley Heights, N.J.

[54] CONTINUOUS MEASUREMENT OF THE THICKNESS OF HOT THIN FILMS
4 Claims, 3 Drawing Figs.
[52] U.S. Cl. ............................................. 117/106 R,
356/108, 117/DIG. 2
[51] Int. Cl. ............................................. C23c 11/00
[50] Field of Search ............................................. 117/106,
DIG. 2; 356/51, 108, 161, 168, 204, 206, 229

[56] References Cited
UNITED STATES PATENTS
3,099,579  7/1963  Spitzer et al. ................ 117/106 X Primary Examiner—Alfred L. Leavitt
Assistant Examiner—Wm. E. Ball
Attorneys—R. J. Guenther and Arthur J. Torsiglieri ABSTRACT: Described herein is a method for monitoring the thickness of a thin transparent film while it is growing on a hot substrate by vapor deposition.

In a specific example, two silicon substrates, of which one has a predeposited coating of silicon dioxide, are located close together to be subjected to a similar vapor deposition of alumina films. The difference in electromagnetic radiation emitted by each substrate and transmitted through each film is monitored, and the deposition process is terminated just after this difference reaches a prescribed value.

PATENTED NOV 16 1971

INVENTORS
C. A. CLARK
A. C. DUMBRI
J. F. ROBERTS

BY

ATTORNEY

CONTINUOUS MEASUREMENT OF THE THICKNESS OF HOT THIN FILMS

BACKGROUND OF THE INVENTION

This invention relates to a method for determining the thickness of a growing transparent thin film as it is being deposited upon a heated substrate, in particular, a semiconductive substrate.

In the growth of thin films, especially by vapor deposition, the rate of deposition is difficult to reproduce; thus it is desirable to have a method for monitoring the thickness of the film as it is growing in situ by vapor deposition. It should be understood that the term "vapor deposition" is used broadly herein, and includes (but is not limited to) such processes as vacuum evaporation, pyrolitic decomposition, plasma deposition, and sputtering.

Of course, several methods exist in the art for measuring the film thickness after the film has been deposited and the deposition process terminated. See, for example, Thin Film Microelectronics, L. Holland (Editor), 1965.

Also, methods are known in the prior art (see for example U.S. Pat. No. 3,099,579, issued July 30, 1963) for determining in situ the thickness of a transparent thin film growing on a hot substrate, by monitoring externally supplied electromagnetic radiation reflected and transmitted therethrough; but such methods suffer from the disadvantage that the radiation emitted by the hot substrate itself obfuscates this determination. Likewise, when the film is being deposited by vapor deposition techniques, accumulations of deposits on the window of the deposition chamber further confuses the film thickness determination in situ. Thus, it is desirable to have a method for determining the thickness of such thin films while they are growing in situ, which avoids these complicating disadvantages.

SUMMARY OF THE INVENTION

Continuous measurement of the thickness of a growing transparent, or at least semitransparent, thin film upon a hot substrate is accomplished by monitoring the intensity of the electromagnetic radiation in a given, preferably narrow, spectral range. This radiation is that which is emitted by the hot substrate and transmitted through the film.

As is known from the theory of optical interference, the transmissivity of a nonconducting thin film whose refractive index is lower than that of a nonconducting emitting substrate, yields minima and maxima approximately in accordance with the formulas $$n\lambda = 2t \quad \text{(minimal)} \quad (1) \text{ (minima)}$$

and $$(n+\tfrac{1}{2})\lambda = 2t \quad \text{(maxima)} \quad (2)$$

where $n$ is an integer or zero; $\lambda$ is the wavelength measured in the film of the radiation being monitored; and $t$ is the thickness of the film. As previously stated, Equations (1) and (2) hold, provided the refractive index of the film is lower than that of the emitting substrate; otherwise equation (1) applies to maxima and equation (2) to minima in case the refractive index of the film is higher than that of the emitting substrate.

In any case, if either the thin film or the substrate is electrically conducting, then equations (1) and (2) do not hold, due to phase shifts different from 0 to $\pi$ upon reflection and transmission at interfaces. However, maxima and minima do occur in any event, although their relationship with thickness of the film may contain an additional term representing these phase shifts, as compared with equations (1) and (2). Thus, as the film grows in thickness, whether or not the substrate or the film is conductive, the intensity of the radiation of a given wavelength emitted by the hot substrate, and as transmitted through the film, undergoes an oscillatory behavior between maxima and minima. By terminating the deposition process immediately after a predetermined number (integral or fractional) of oscillations have occurred, a predetermined desired thickness of film is thereby deposited.

Furthermore, in order to avoid complications caused by fluctuations of temperature of the substrate, as well as those caused by the deposition of film upon the windows of the deposition chamber, it is advantageous to proceed with two substrates, one of which has a predeposit of another transparent, or at least semitransparent, coating of preselected thickness. Except for the coating, the two substrates are otherwise identical; but this is not essential. The material used in this predeposited coating is desirably selected from among those which are known to be relatively easy to grow reproducibly to a preselected thickness upon the substrate. The two substrates, only one of which has the aforesaid predeposited coating, are then placed in mutually close proximity (for thermal equilibrium between them) while the deposition process of the desired film is carried out at the same rate upon both substrates at the same elevated temperature. While this deposition is taking place, the electromagnetic radiation emitted by the substrates and transmitted through the films is either periodically or continuously measured, within a given spectral range, i.e., wavelength interval. The difference between the two intensities of radiation thus monitored from the two substrates will itself have an oscillatory behavior with time. Thus a film of the desired thickness will be deposited (upon both substrates) immediately after a predetermined (integral or fractional) number of such oscillations have taken place. The calibration of the number of such oscillations with respect to film thickness may be made by earlier experiment, or by utilizing the fact that each such oscillation corresponds to an increase in thickness of one half the average wavelength of monitored radiation, said average wavelength as measured in the film however. Advantageously, the intensity of electromagnetic radiation emitted from each substrate is monitored by a separate photodetector; and their output ratio for given incident radiation is adjusted so that the difference in their outputs is zero just when the desired film thickness is reached, so that more accurate control over the resulting thickness is obtained. This invention together with its advantages, features, and objects may be better understood from the following detailed description when read in conjunction with the drawing in which:

EXAMPLE I

Figure 1:
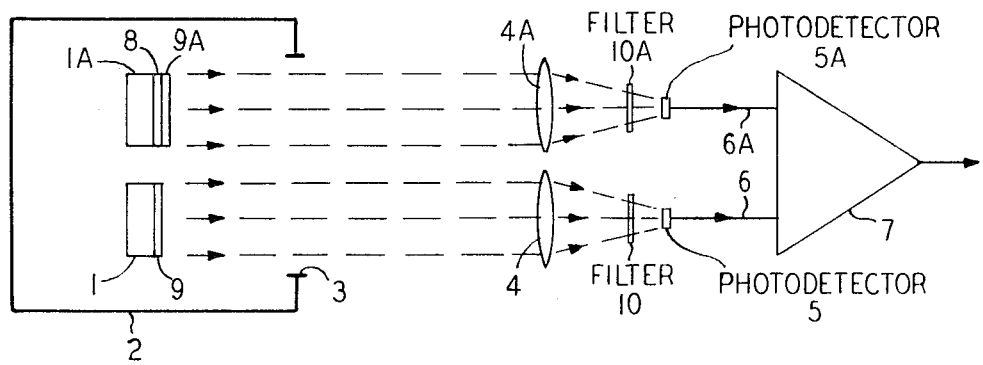
FIG. 1 is a diagram, not to scale, of apparatus useful for carrying out a specific embodiment of this invention.

Referring to FIG. 1, silicon substrates 1 and 1A are located inside a deposition chamber 2 having a window 3 transparent, or at least semitranslucent, to the radiation from the substrates 1 and 1A to be monitored. Lenses 4 and 4A collect and focus this radiation from substrates 1 and 1A respectively upon the surfaces of photodetectors 5 and 5A, chosen to be sensitive to the radiation. Stops, not shown, prevent radiation from substrate 1 from reaching photodetector 5A, and prevent radiation from 1A from reaching 5. The outputs 6 and 6A of these photodetectors are fed into the difference amplifier 7, whose output is monitored by means (not shown) familiar to those skilled in the art.

The substrate 1A has a predeposit of a coating 8 of $SiO_1$ (silicon dioxide) of prescribed thickness, 810 A thick for example. This coating 8 may be obtained by methods known in the art, such as thermal growth in steam. The prescribed thickness may be obtained by predetermining the deposition rate by methods known in the art, such as either visible or ultraviolet spectrophotometry, or else by multiple beam interferometry. Both the substrates 1 and 1A are subjected to the same vapor deposition process, as known in the art, of a desired transparent film material, $Al_2O_3$ (alumina) for example. The provision of a thin layer of alumina or silicon is useful in the fabrication of one form of insulated gate field-effect transistor (IGFET). The substrates 1 and 1A are located close together so that the films 9 and 9A grow at the same rate and the substrates are in thermal equilibrium with each other. The substrates 1 and 1A are maintained typically at a temperature of 900° C. or more during the deposition process, so that they radiate appreciable amounts of spectral radiation in the neighborhood of 6,000 A vacuum wavelength. While the deposition proceeds, layers of the $Al_2O_3$ films 9 and 9A grow upon the substrates 1 and 1A respectively, and the difference between the outputs 6 and 6A of the photodetectors 5 and 5A respectively is measured by the difference amplifier 7. When When this difference reaches a prescribed value after a prescribed number of oscillations, the vapor deposition process is terminated. At this point, both substrates 1 and 1A will have a film 9 and 9A of the desired thickness, as will more clearly appear from the following discussion of FIG. 2. Advantageously for optimum accuracy, the parameters are adjusted so that the desired film thickness is reached when the difference between the outputs 6 and 6A is equal to zero, as will also more clearly appear from the following.

For sharper results, filters (10 and 10A) known in the art are placed before the photodetectors 5 and 5A. These filters are selected to transmit only a narrow range (30A half bandwidth) of the spectrum of the radiation. Thus, the photodetectors measure the intensity of radiation in this narrow spectral range emitted by the hot substrates 1A and 1, as transmitted through the layers 8, 9A, and 9.

Figure 2:
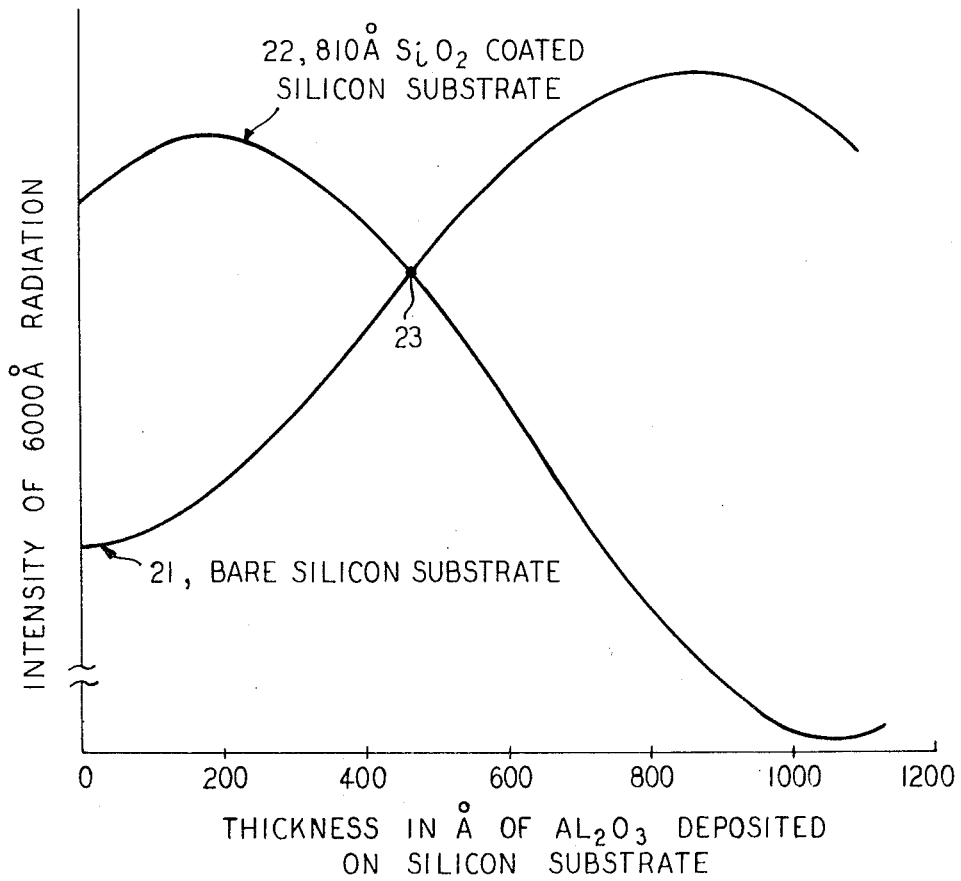
FIG. 2 is a plot of the radiation intensity versus film thickness, obtained in a specific embodiment of this invention.

Referring to FIG. 2, curve 21 shows a calibration plot of the intensity of radiation centered at 6,000 A (vacuum wavelength) versus thickness of $Al_2O_3$ film 9 being deposited on substrate 1 at 925° C. This curve 21 is obtained by means of measuring the film thickness subsequent to various depositions, by methods known in the art. It should be noted that the distance along the horizontal axis between the first maximum and the first minimum (i.e., one half an oscillation) is 860 A. Thus, a complete oscillation in the curve 21 in FIG. 2 would correspond to a deposit of $Al_2O_3$ whose thickness is equal to 1,720 A, i.e., one-half the wavelength in the film 9 (of $Al_2O_3$ at 925° C.) of the radiation having a vacuum wavelength of 6,000 A. Hence, oscillations or fractions thereof in curve 21 is a measure of thickness of the $Al_2O_3$ film 9 on the substrate 1.

Curve 22 in FIG. 2 shows a plot of the intensity of radiation, centered at 6,000 A vacuum wavelength, versus thickness of the $Al_2O_3$ film 9A growing on the 810 A thick $SiO_2$ coating 8 on the silicon substrate 1A. Due to the predeposited $SiO_2$ coating 8, the curves 22 and 21 are "out of phase," that is, their maxima and minima do not correspond to the same $Al_2O_3$ film thickness. It should be remembered that due to the mutually close positioning of the substrates 1 and 1A, the thicknesses of films 9 and 9A are essentially equal to each other at all times during their growth. Curves 21 and 22 intersect, for the first time starting from zero thickness, at the point 23; corresponding to an $Al_2O_3$ film thickness of 470 A for both films 9 and 9A. Thus, for a desired thickness of $Al_2O_3$ films 9 and 9A equal to 470 A, the deposition process is terminated on the first occasion at which the difference in the outputs 6 and 6A, measured by the difference amplifier 7, gives a null. Since nulls are easier to detect than other quantities, it is advantageous to utilize such nulls in the determinations of the thicknesses of films 9 and 9A.

The degree to which the curves 21 and 22 are "out of phase" depends upon the original thickness of the $SiO_2$ coating 8 on the substrate 1A, among other things. Hence, by choosing this original $SiO_2$ coating 8 to be different from the 810 A assumed above, the first null, i.e., the crossing point 23 of the curves 21 and 22 can be made to occur at a position corresponding to a thickness of $Al_2O_3$ films 9 and 9A different from the above 470 A. Likewise, by waiting until the second (later) crossing (off scale in FIG. 2, at 1,410 A thickness of $Al_2O_3$) produces a second null in the output of the difference amplifier 7, a thickness of $Al_2O_3$ films 9 and 9A would be obtained equal to 1,410 A thick.

The crossing point 23 may also be made to correspond to a different value of thickness of films 9 and 9A from the above 470 A, by varying the ratio of the apertures of the photodetectors 5 to 5A, or by varying the ratio of their outputs 6 and 6A for given incoming radiation intensity, as known in the art. Such adjustments of the photodetectors have the effect of vertically displacing curves 21 and 22 with respect to each other, thereby changing the abscissa of their crossing point 23, as desired.

EXAMPLE II

Figure 3:
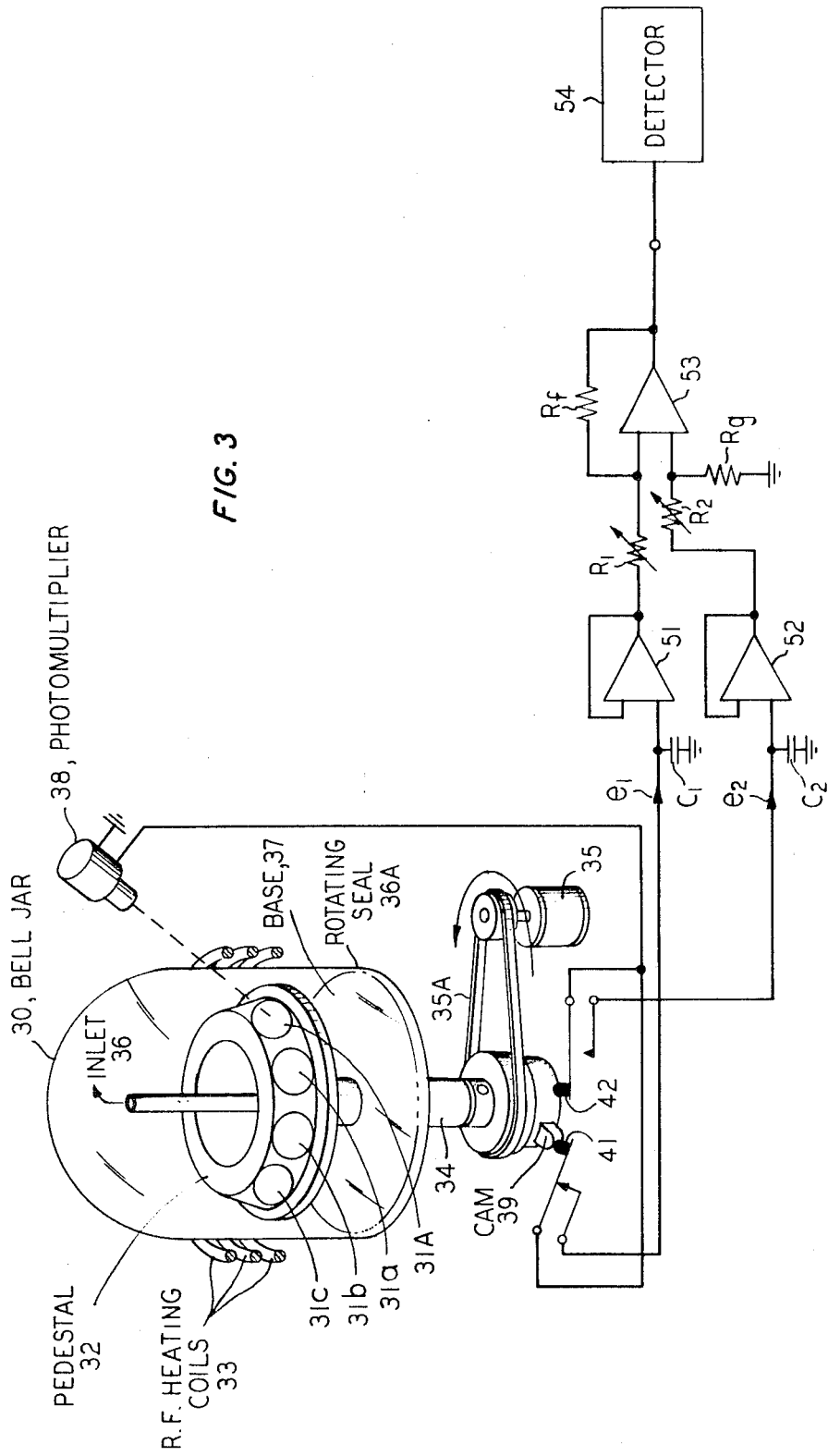
FIG. 3 is a diagram, not to scale, of application useful for carrying out another specific embodiment of this invention.

Referring to FIG. 3, a plurality of substantially identical clean silicon slice substrates 31a, b, c...are located inside a quartz bell jar 30 on a pedestal 32. For definiteness, substrate 31a is called the "control" substrate. Silicon slice substrate 31A has a predeposited coating of silicon dioxide of prescribed thickness, 810 A thick for example as described in example I above. The pedestal 32 together with all the substrates are all heated by means of radio frequency heating coil 33. The pedestal 32, mounted on a shaft 34, is rotated by the belt drive 35A driven by the motor 35. A rotating seal 36 is provided along the periphery of the base 37, to seal the bell jar 30.

The vapor, containing the aluminum oxide to be deposited, is introduced into the bell jar 30 through the gas inlet 36. As the shaft 34 rotates the pedestal 32, the photomultiplier head 38 detects the electromagnetic radiation emitted by that substrate on the pedestal 32 which is instantaneously aligned. A cam 39 attached to the shaft 34 engages each of the microswitches 41 or 42 once per rotation of the shaft. In particular, when the precoated substrate 31A is instantaneously aligned with the photomultiplier head 38, the microswitch 41 is positioned to be instantaneously closed temporarily, but it is otherwise open. Likewise, when the "control" substrate 31A is aligned with photomultiplier head 38, the cam 39 temporarily closes the microswitch 42. The substrates 31A and 31a are thus located on the pedestal 32 in relation to the cam 39 in predetermined positions to accomplish these closings of the microswitches 41 and 42, to which the output of the photomultiplier 38 is connected electrically.

Microswitches 41 and 42 are electrically connected respectively to amplifiers 51 and 52, respectively. Each of these amplifiers is in a "cathode follower" negative voltage feedback arrangement, to present an input impedance which is much larger than the impedance of the photomultiplier 38 when operating. Capacitors $C_1$ and $C_2$ are connected to amplifiers 51 and 52 respectively, to furnish a time constant which is large compared with the period of rotation of the pedestal 32. The input voltage signals $e_1$ and $e_2$ to the amplifiers 51 and 52, respectively, are supplied by the photomultiplier 38 in response to the electromagnetic radiation emitted by the substrates 31A and 31a. The output signals of the amplifiers 51 and 52 both are thus constant signals for one rotation of the pedestal 32, and may change only stepwise in response to the fresh signal supplied from the photomultiplier upon each new rotation (during the closing of the microswitches 41 and 42), in response to the radiation from the substrate 31A or 31a. These output signals of amplifiers 51 and 52 are supplied to the difference amplifier 53, through resistors $R_1$ and $R_2$. Negative feedback resistor $R_f$ is advantageous in limiting the gain of amplifier 53 to a desirable range for transmission to the detector 54. Resistor $R_o$ stabilizes the amplifier 53, if desired.

Resistor $R_1$ is adjustable, in order to control the relative sensitivity of the difference amplifier 53 to the two signals from amplifiers 51 and 52, to correct for such imbalances as the inequality of gain in amplifier 51 versus 52, for example. Thus, the detector 54 effectively presents the difference between the radiation being emitted in the bell jar 30 by substrates 31A and 31a as transmitted through the films being deposited thereon as the deposition process proceeds. This difference undergoes an oscillatory behavior as the deposition process builds up the films upon the substrates. When this difference reaches a predetermined value, advantageously zero, after a predetermined number of oscillations, the deposition process is terminated immediately. At this time, the substrates 31a, b, c...will all have a film of aluminum oxide of predetermined desired thickness, as should be obvious from example I above.

It should now be obvious to those skilled in the art how to modify the above detailed examples to apply the same technique to other parameters such as other substrates, substrate temperatures, predeposited coatings, and transparent films desired of given thickness. Likewise, deposition chambers such as described in copending application, D. R. Oswald Ser. No. 74744,415, filed July 12, 1968 and having the same assignee as the present application, may also be used in the practice of this invention.

Although this invention has been set forth in terms of detailed examples, various modifications are possible within the scope of the invention.

What is claimed is:

1. (Twice amended) The method of growing, upon a first silicon substrate, an aluminum oxide film having a desired thickness comprising the steps of:
   a. forming a silicon dioxide coating of preselected thickness upon a second silicon substrate, said coating being at least semitransparent in a predetermined spectral range of the electromagnetic radiation emitted by the second substrate at an elevated temperature;
   b. placing said first and said second substrates in a heated environment at the elevated temperature, so that both the first and the second substrates are heated to the same temperature;
   c. growing the aluminum oxide film upon both said substrates at equal rates by vapor deposition; and
   d. monitoring the difference in the intensities of the electromagnetic radiation emitted by both said substrates ad transmitted through the films thereon in the predetermined spectral range.

2. The method of claim 1 in which the growing is terminated when the difference in intensities is zero.

3. The method of claim 1 in which the spectral range is centered at about 6,000 A, and the elevated temperature is of the order of 900° C.

4. The method of claim 1 in which the thickness of the silicon dioxide coating is about 810 A.

* * * * *